J. DUBOIS, Jr.
Carriage-Brake.
No. 4,571.
Patented June 13, 1846.
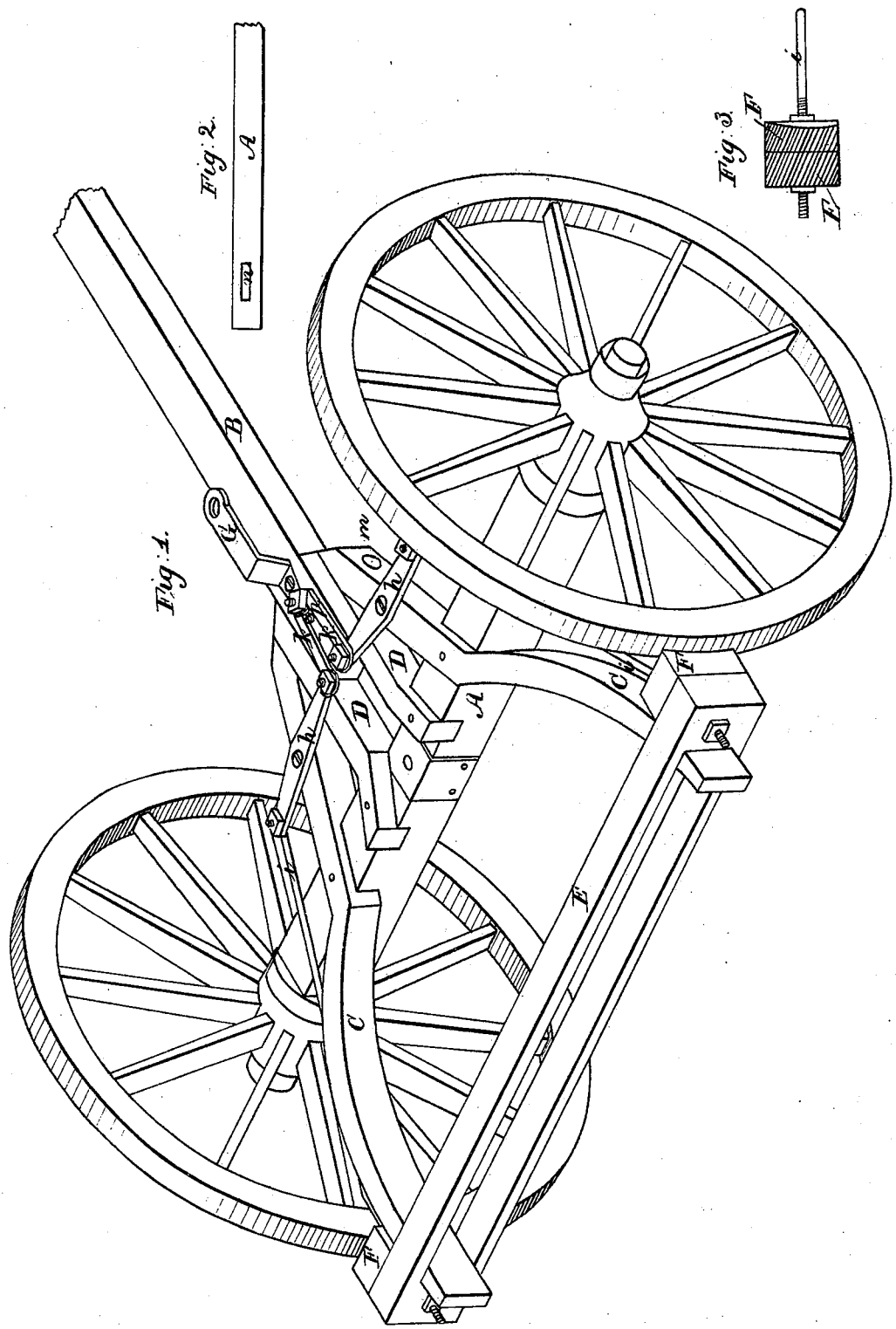

UNITED STATES PATENT OFFICE.

JNO. DU BOIS, JR., OF CASCADE TOWNSHIP, LYCOMING COUNTY, PENNSYLVANIA.

SELF-ACTING BRAKE FOR CARRIAGES.

Specification forming part of Letters Patent No. 4,571, dated June 13, 1846; Reissued November 4, 1846, No. 89.

*To all whom it may concern:*

Be it known that I, JOHN DU BOIS, Jr., of Cascade township, in the county of Lycoming and State of Pennsylvania, have invented a new and useful Method of Adapting and Attaching Self-Acting Brakes to the Forward Wheels of Four-Wheeled Vehicles for the Purpose of Retarding Their Motion in Descending Hills; and I do hereby declare the following to be a full and exact description thereof, reference being had to the accompanying drawings, making a part of this specification.

The nature of my invention consists in extending the hounds, which stay and support the pole of a vehicle, back a sufficient distance beyond the forward wheels of the same, to enable me to secure to the rear ends of the hounds an adjustable sway bar, to each end of which I secure brakes or rubbers. The bar to which the rubbers are attached is connected to the rear end of the pole by means of levers, &c., in such a manner that when there is any pressure of the vehicle forward the horses in pressing back upon the pole will press both rubbers uniformly against the two forward wheels. The rubbers always acting at right angles with the pole, whether the pole be in line with the body of the vehicle or otherwise.

In the accompanying drawings Figure 1, is a perspective elevation of a pair of wheels, and axle, with a section of a pole secured to the same, and also my improved brakes secured to the hounds and pole as hereinafter described. Fig. 2, is a side elevation of the rear end of the pole, and Fig. 3, is an end elevation of one of the rubbers, the sway bar to which it is secured, and a section of one of the connecting rods, $i$, also showing the manner of securing the rubbers to the sway bar E and the manner of graduating the rubbers to a proper distance from the wheels, by means of the screw on the end of the connecting rod $i$, and the nuts on the outer sides of the bar and rubbers.

A, is the axle; B, is the pole.

C, C, are the hounds.

D, D, are guide braces between the pole and hounds.

E, is the cross sway bar to which are secured the rubbers F, F.

G, is the hammer strap, secured to the rear end of the pole.

$h, h$, are rock levers, secured to the hounds.

$i, i$, are connecting rods or bars, which connect the outer ends of the rock levers ($h, h$,) with the adjustable sway bar E, passing through the rubbers and securing them to the sway bar, by means of screws and nuts as represented. The screws and nuts upon the connecting bars $i, i$, also serve for regulating and graduating the distance of the rubbers from the wheels.

$k, k$, are connecting bars, which connect the inner ends of the rock levers ($h, h$,) with the rear end of the pole, by means of a bolt passing up through the pole, the hammer strap, and the connecting bars. The pole is secured between the guide braces D, D, by the bolt $m$, which passes through the hounds and braces, and through the mortise $n$, in the pole. The pole therefore can slide freely between the guide braces, to the extent of the length of the mortise. When it is desired to prevent the rubbers from acting on the wheels in backing the vehicle, a bolt $p$, is inserted into a hole in the pole just in front of the draft bolt $m$, which prevents the pole from sliding backward between the guide braces (D, D,). In descending a hill, when the load presses the vehicle forward upon the horses, the pole is pushed back, and acting on the rock levers, $h, h$, draws the rubbers against the wheels by means of the connecting bars $i, i$, and $k, k$, with a force corresponding to the weight of the load and the inclination of the hill.

The adjustable sway bar E, is composed of two pieces united at their ends, or of a single piece of timber with a slot or mortise cut through it of sufficient length to allow the hounds to pass through at each end of the same, on which the sway bar slides freely by the action of the pole to which it is connected. The reach pole which connects the rear to the forward axle of a wagon, passes through the slot in the sway bar.

Having thus fully described the construction and operation of my self acting brake as applied to the forward wheels of wagons or other four wheel vehicles, what I claim therein as new and desire to secure by Letters Patent, is—

The placing on the rear ends of the extended hounds (C, C,) which support the pole an adjustable movable sway bar E, having brakes or rubbers attached to each of its extended ends in a position to act on the forward wheels of a wagon or carriage when its forward motion is retarded by the pole, the adjustable sway bar E, being connected to and operated by the pole by means of connecting rods and levers, the whole combined and operating substantially in the manner and for the purpose hereinbefore set forth.

JOHN DU BOIS, Junr.

Witnesses:
Z. C. Robbins,
J. M. Thayer.

[First Printed 1913.]